United States Patent
Natanzon et al.

(10) Patent No.: US 10,333,951 B1
(45) Date of Patent: Jun. 25, 2019

(54) METHOD AND SYSTEM FOR IMPLEMENTING GOLDEN CONTAINER STORAGE

(71) Applicant: EMC IP Holding Company LLC, Hopkinton, MA (US)

(72) Inventors: Assaf Natanzon, Tel Aviv (IL); Amit Lieberman, Kefar Sava (IL); Oron Golan, Meitar (IL); Yuri Manusov, Beer Sheba (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 15/664,719

(22) Filed: Jul. 31, 2017

(51) Int. Cl.
*H04L 29/06* (2006.01)

(52) U.S. Cl.
CPC ...... *H04L 63/1416* (2013.01); *H04L 63/1425* (2013.01); *H04L 63/1491* (2013.01)

(58) Field of Classification Search
CPC ............. H04L 63/1416; H04L 63/1425; H04L 63/1491
See application file for complete search history.

(56) References Cited

U.S. PATENT DOCUMENTS

| | | | | |
|---|---|---|---|---|
| 8,601,583 B1* | 12/2013 | Chandrasekhar | ....... | G06F 21/54 726/24 |
| 8,612,971 B1* | 12/2013 | Fitzgerald | ........... | G06F 9/45533 718/1 |
| 8,856,782 B2* | 10/2014 | Ghosh | ................. | G06F 9/45533 718/1 |
| 8,949,825 B1* | 2/2015 | Fitzgerald | ........... | G06F 9/45537 718/1 |
| 9,098,698 B2* | 8/2015 | Ghosh | ...................... | G06F 21/55 |
| 9,495,188 B1* | 11/2016 | Ettema | ................. | G06F 9/45533 |
| 9,860,208 B1* | 1/2018 | Ettema | .................. | G06F 21/602 |
| 10,044,675 B1* | 8/2018 | Ettema | ................ | H04L 63/0227 |
| 10,075,455 B2* | 9/2018 | Zafar | .................. | H04L 63/1416 |
| 10,185,638 B2* | 1/2019 | Duan | .................. | H04L 63/1408 |
| 10,187,417 B2* | 1/2019 | Ghosh | ...................... | G06F 21/55 |
| 2006/0136720 A1* | 6/2006 | Armstrong | .............. | G06F 21/53 713/164 |
| 2007/0208822 A1* | 9/2007 | Wang | ................... | H04L 63/1416 709/217 |
| 2007/0300220 A1* | 12/2007 | Seliger | ...................... | G06F 8/61 718/1 |
| 2008/0016570 A1* | 1/2008 | Capalik | ............... | H04L 63/1408 726/23 |

(Continued)

*Primary Examiner* — Darren B Schwartz
(74) *Attorney, Agent, or Firm* — Chamberlain, Hrdlicka, White, Williams & Aughtry

(57) ABSTRACT

A method and a system for implementing golden container storage. Specifically, the disclosed method and system entail the creation of a container registry to securely store golden containers (or templates) for containers of specific application types that execute within a service platform. Given short retention spans, the containers are constantly being cycled out. Each recreated container is modeled after one of the golden containers, and assigned new Internet Protocol (IP) and/or media access control (MAC) addresses rather than assuming the existing addresses of the containers the recreated containers replace. Substantively, embodiments of the invention employ these tactics towards implementing a moving target defense (MTD) strategy.

19 Claims, 7 Drawing Sheets

(56) References Cited

U.S. PATENT DOCUMENTS

| | | | | |
|---|---|---|---|---|
| 2008/0134175 | A1* | 6/2008 | Fitzgerald | G06F 9/45533 |
| | | | | 718/1 |
| 2008/0148403 | A1* | 6/2008 | Manion | G06F 21/56 |
| | | | | 726/22 |
| 2008/0263658 | A1* | 10/2008 | Michael | G06F 21/562 |
| | | | | 726/22 |
| 2008/0282350 | A1* | 11/2008 | Khilnani | G06F 21/57 |
| | | | | 726/24 |
| 2009/0089860 | A1* | 4/2009 | Forrester | H04L 63/12 |
| | | | | 726/3 |
| 2009/0158432 | A1* | 6/2009 | Zheng | G06F 21/562 |
| | | | | 726/24 |
| 2011/0214176 | A1* | 9/2011 | Burch | G06F 9/455 |
| | | | | 726/15 |
| 2012/0002839 | A1* | 1/2012 | Niemela | G06K 9/00973 |
| | | | | 382/100 |
| 2012/0079596 | A1* | 3/2012 | Thomas | G06F 21/55 |
| | | | | 726/24 |
| 2012/0174225 | A1* | 7/2012 | Shyamsunder | G06F 21/566 |
| | | | | 726/24 |
| 2012/0255002 | A1* | 10/2012 | Sallam | G06F 21/566 |
| | | | | 726/23 |
| 2013/0212709 | A1* | 8/2013 | Tucker | G06F 21/55 |
| | | | | 726/29 |
| 2015/0096007 | A1* | 4/2015 | Sengupta | H04L 63/0218 |
| | | | | 726/11 |
| 2015/0220735 | A1* | 8/2015 | Paithane | G06F 21/566 |
| | | | | 726/23 |
| 2017/0265076 | A1* | 9/2017 | Richards | H04L 47/10 |
| 2018/0054314 | A1* | 2/2018 | Edwards | G06F 11/0721 |
| 2018/0375889 | A1* | 12/2018 | Dickenson | H04L 67/12 |

* cited by examiner

METHOD AND SYSTEM FOR IMPLEMENTING GOLDEN CONTAINER STORAGE

BACKGROUND

The static nature of current computing systems strengthens the susceptibility of the computing system to hacker attacks and unauthorized modifications.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and a system for implementing golden container storage. Specifically, one or more embodiments of the invention entail the creation of a container registry to securely store golden containers (or templates) for containers of specific application types that execute within a service platform. Given short retention spans, the containers are constantly being cycled out. Each recreated container is modeled after one of the golden containers, and assigned new Internet Protocol (IP) and/or media access control (MAC) addresses rather than assuming the existing addresses of the containers the recreated containers replace. Substantively, embodiments of the invention employ these tactics towards implementing a moving target defense (MTD) strategy.

Figure 1:
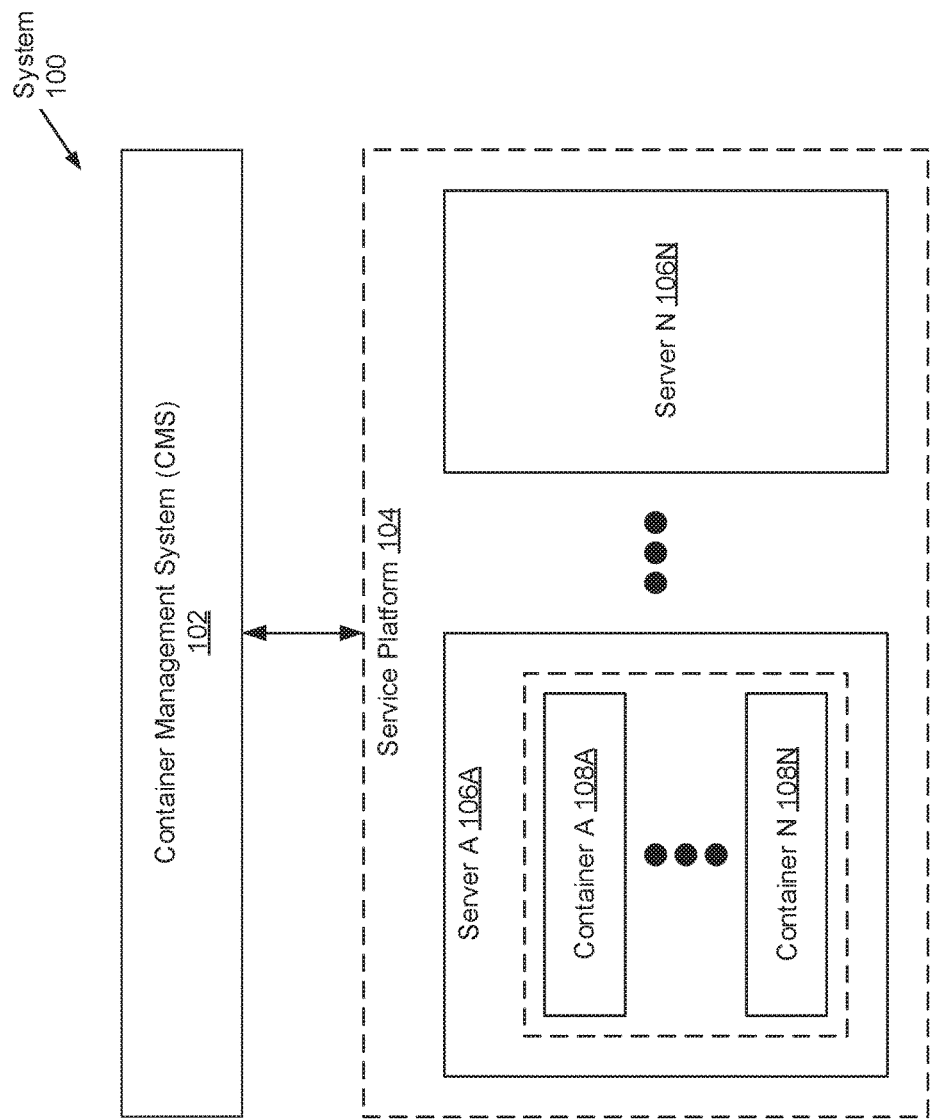
FIG. 1 shows a system in accordance with one or more embodiments of the invention.

FIG. 1 shows a system in accordance with one or more embodiments of the invention. The system (100) includes a container management system (CMS) (102) operatively connected to a service platform (104). Each of these components is described below.

In one embodiment of the invention, the CMS (102) and the service platform (104) may be directly or indirectly connected to one another through a network (e.g., a local area network (LAN), a wide area network (WAN) such as the Internet, a mobile network, or any other type of network). The network may be implemented using any combination of wired and/or wireless connections. In embodiments in which the CMS (102) and the service platform (104) are indirectly connected, there may be other networking components or systems (e.g., switches, routers, gateways, etc.) (not shown) that facilitate communication and/or information exchange. Further, the CMS (102) and the service platform (104) may communicate with one another using any combination of wired and/or wireless communication protocols.

In one embodiment of the invention, the CMS (102) may be a platform for the centralized management and deployment of containers in the service platform (104). The CMS (102) may be implemented on a physical server (e.g., in a data center) or on a virtual server that may be cloud-based. Further, the CMS (102) may be implemented on a single server, or alternatively, on multiple servers that may be physical, virtual, or a combination thereof. In one embodiment of the invention, the CMS (102) may be implemented on one or more computing systems similar to the exemplary computing system shown in FIG. 6. The CMS (102) is described in further detail below with respect to FIG. 2.

In one embodiment of the invention, the service platform (104) may be a hardware and/or software implemented environment for the deployment of services and resources. The service platform (104) may be implemented on one or more servers (106A-106N). Each server (106A-106N) may be a physical server or a virtual server that may be cloud-based. In one embodiment of the invention, each server (106A-106N) may be a computing system similar to the exemplary computing system shown in FIG. 6. Further, each server (106A-106N) may be any computing system that may be programmed to receive requests, process requests, and based on the processing of requests, extend services and/or resources to client computing systems (not shown). Examples of types of servers include, but are not limited to, virtualized servers, database servers, application servers, print servers, and mail servers.

In one embodiment of the invention, each server (106A-106N) may be further programmed to provide computing resources to support the implementation and functionalities of a set of containers (108A-108N). A container (108A-

108N) may be an isolated, lightweight virtualization mechanism (or software construct) that allows for the running of an application or an operating system within the container (108A-108N) without the overhead of executing a hypervisor (as is needed for executing virtual machines on underlying hardware). Minimal overhead may be generated by containers because: (i) containers share the same operating system kernel with other containers and the underlying host (e.g., server); and (ii) containers (unlike virtual machines) do not need to emulate physical hardware. Further, in one embodiment of the invention, a container (108A-108N) may be implemented virtually by a host operating system.

In one embodiment of the invention, the set of containers (108A-108N) may be segmented into one or more pods (not shown). Specifically, each pod may include a subset of the set of containers (108A-108N). In one embodiment of the invention, the aforementioned subset of containers (108A-108N) may be co-located in the same server (e.g., 106A). In another embodiment of the invention, the aforementioned subset of containers (108A-108N) may be executing on multiple servers (106A-106N) of the service platform (104). Furthermore, the subset of containers (108A-108N) in each pod may work together towards implementing a service. Subsequently, each container (108A-108N) in a pod may be assigned an application type, and thus, include functionalities conforming to their assigned application type. The application type that may be assigned to a container (108A-108N) may include, but is not limited to, a front-end application type, a back-end application type, and a database application type.

In one embodiment of the invention, a front-end application type container (108A-108N) may be representative of server computing resources dedicated towards facilitating the interaction between a service and a user, or a service and another service. Specifically, a front-end application type container (108A-108N) may include functionality to: (i) provide a specification for how the interaction and/or exchange of information should take place between the service and a user or other service; (ii) receive input (i.e., data, requests, etc.), conforming to the aforementioned specification, from a user or other service; and (iii) provide output (i.e., processed data, responses, resources, etc.), conforming to the aforementioned specification, to a user or other service. By way of examples, a front-end application type container (108A-108N) may implement at least a portion of a command line interface (CLI), a graphical user interface (GUI), an application program interface (API), a web-based user interface (WUI), a natural language interface, or any combination thereof.

In one embodiment of the invention, a back-end application type container (108A-108N) may be representative of server computing resources dedicated towards implementing the functional logic and operations supporting a service. Specifically, a back-end application type container (108A-108N) may include functionality to: (i) validate received input from a user or other service; (ii) maintain service-wide security operations; (iii) communicate with external hosts to retrieve additional information; and (iv) process (i.e., execute algorithms on) the received input and additional information, if any, to generate output. By way of examples, a back-end application type container (108A-108N) may implement at least a portion of a data processing algorithm, a validation rule, an internet security suite, a web-service (i.e., technology that allows services/applications to communicate with each other), etc.

In one embodiment of the invention, a database application type container (108A-108N) may be representative of server computer resources dedicated towards the management of information. Specifically, a database application type container (108A-108N) may include functionality to: (i) track and administer information generated, stored, and/or used by the service; (ii) maintain a schema (i.e. logical structure) for the information; (iii) monitor information storage and retrieval performance; and (iv) encode information through the application of, for example, encryption, compression, deduplication, and other data transforming operations. By way of examples, a database application type container (108A-108N) may implement at least a portion of database management system (DBMS), an encryption, compression, deduplication, etc., algorithm, a query-response system (QRS), etc.

While containers throughout the disclosure may host applications, and thus, may be associated with application types (described above), one of ordinary skill will appreciate that containers can host other constructs without departing from the scope of the invention. For example, in one embodiment of the invention, a container (108A-108N) may alternatively host a micro-service, which may structure an application as a collection of coupled services. In another embodiment of the invention, a container (108A-108N) may alternatively host a web server, and thereby include functionality to store, process, and/or deliver web resources to one or more clients (not shown). In yet another embodiment of the invention, a container (108A-108N) may alternatively host a monitoring tool for the surveilling of, for example, web resources, servers, networks, and/or application performance and reliability.

Figure 2:
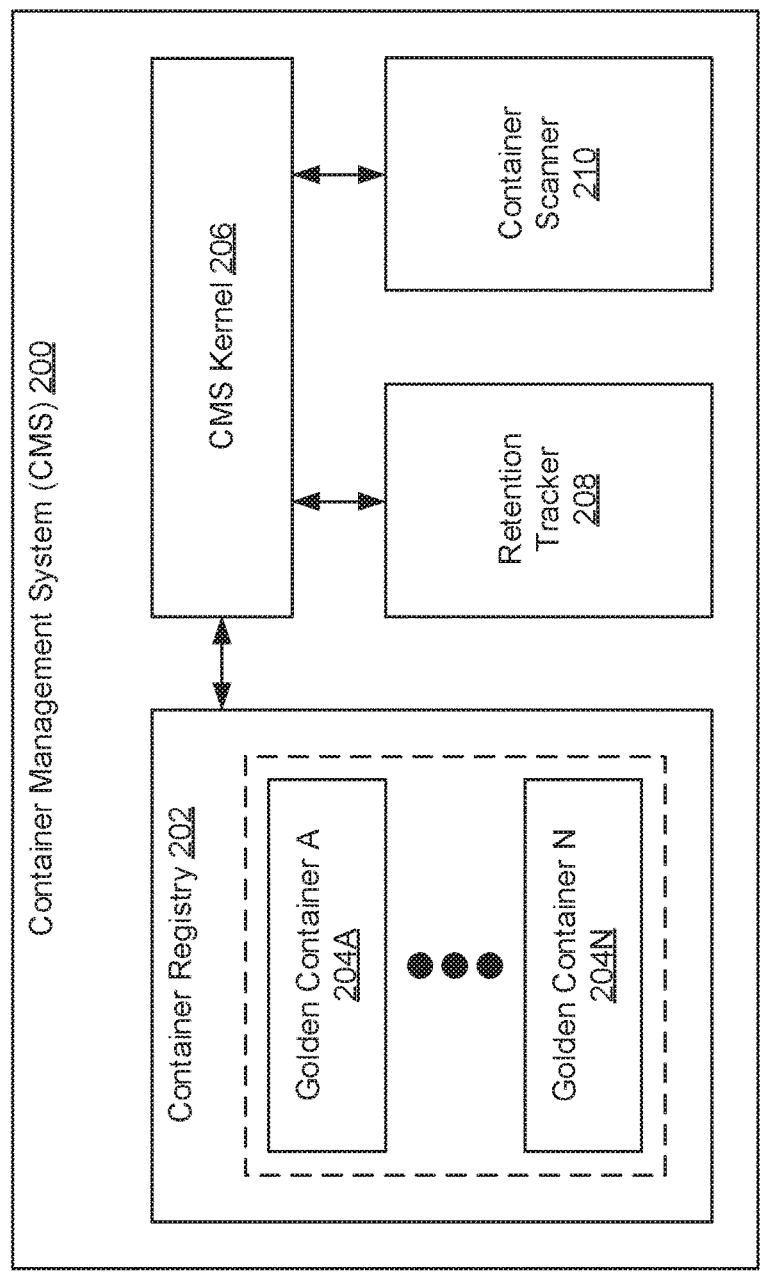
FIG. 2 shows a container management system in accordance with one or more embodiments of the invention.

FIG. 2 shows a container management system (CMS) in accordance with one or more embodiments of the invention. The CMS (200) includes a CMS kernel (206) operatively connected to a container registry (202), a retention tracker (208), and a container scanner (210). Each of these components is described below.

In one embodiment of the invention, the CMS kernel (206) may be a core application or computer program (i.e., an operating system) executing on the underlying hardware (e.g., one or more integrated circuits) of the CMS (200). The CMS kernel (206) may include functionality to: (i) generate, store, and retrieve golden containers (described below); (ii) create containers based on a golden container of the same application type; (iii) delete or reassign containers as honeypots; (iv) generated and feed emulated network traffic to honeypot containers; (v) submit scan requests to, and receive scan responses from, the container scanner (210); and (vi) submit track requests to, and receive elapse notifications from, the retention tracker (208). One of ordinary skill will appreciate that the CMS kernel (206) may include other functionalities without departing from the scope of the invention.

In one embodiment of the invention, the container registry (202) may be a secure repository for storing one or more golden containers (204A-204N). The container registry (202) may be segmented into one or more logical partitions (not shown), whereby each logical partition may be reserved to store golden containers (204A-204N) for a particular service implemented on the service platform. The container registry (202) may be implemented using any type of storage unit and/or device (e.g., a file system, a database, a collection of tables, or any other storage mechanism). Further, the container registry (202) may be implemented using multiple storage units and/or devices, which may or may not be of the same type or located at the same physical site. In one embodiment of the invention, the container registry (202) may be implemented using persistent (i.e., non-volatile)

storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

In one embodiment of the invention, a golden container (204A-204N) may be a template for all containers of a specific application type that implement at least a portion of a service deployed through the service platform. Specifically, a golden container (204A-204N) may be a version (i.e., snapshot at a given time) of a cloned container belonging to a specific application type and used in the implementation of a service. Further, a golden container (204A-204N) may be used as a template for the generation of new containers of that specific application type towards implementing at least a portion of the service. As mentioned above, a container (and subsequently, a golden container (204A-204N)) may be associated with a front-end application type, a back-end application type, or a database application type. In one embodiment of the invention, a golden container (204A-204N) may include all the libraries, tools, and software needed to support the functionalities and/or responsibilities of a container assigned to their specific application type and towards implementing at least their portion of a service. Further, in one embodiment of the invention, a golden container (204A-204N) may also be referred to as a golden image or a master image/container.

In one embodiment of the invention, the retention tracker (208) may be a computer process (or an instance of a computer program) executing on the CMS (200). Specifically, the retention tracker (208) may be a computer process dedicated towards the management of container retention times. A container retention time may refer to a duration of time (e.g., minutes, hours, etc.) specifying the lifespan of a container executing on the service platform. In one embodiment of the invention, the retention tracker (208) may include functionality to: (i) receive track requests from the CMS kernel (206); (ii) in response to receiving track requests, initialize and track the retention time for one or more containers actively executing on the service platform; and (iii) when a retention time for a container elapses, generate and transmit an elapse notification to the CMS kernel (206).

In one embodiment of the invention, the container scanner (210) may be a computer process (or an instance of a computer program) executing on the CMS (200). Specifically, the container scanner (210) may be a computer process dedicated towards the validation of containers. Validation of a container may refer to determining whether the container includes computer readable program code consistent with malicious activity, and/or whether the container exhibits anomalous behavior. Thus, in one embodiment of the invention, the container scanner (210) may include functionality to: (i) maintain and update a library of digital signatures (e.g., patterns of data) unique to one or more known cyber threats and/or attacks; (ii) generate models of the intended behavior (e.g., normal operation) of one or more containers executing on the service platform; (iii) receive scan requests from the CMS kernel (206) specifying container IDs; (iv) in response to receiving scan requests, subject containers to one or more misuse and/or anomaly detection algorithms; (v) based on a matching of at least one known digital signature to at least a portion of a container, determining that the container is contaminated; (vi) based on at least one deviation from a model exhibited by an active container, determining that the container is contaminated; (vii) based on not one match to a known digital signature to at least a portion of a container and based on observing no deviations in behavior exhibited by a container with respect to a model of the container, determining that the container is clean; and (viii) generate and provide scan responses, to the CMS kernel (206), including the results of the validation process (e.g., that a container is clean, or alternatively, that a container is contaminated).

Figure 3A:
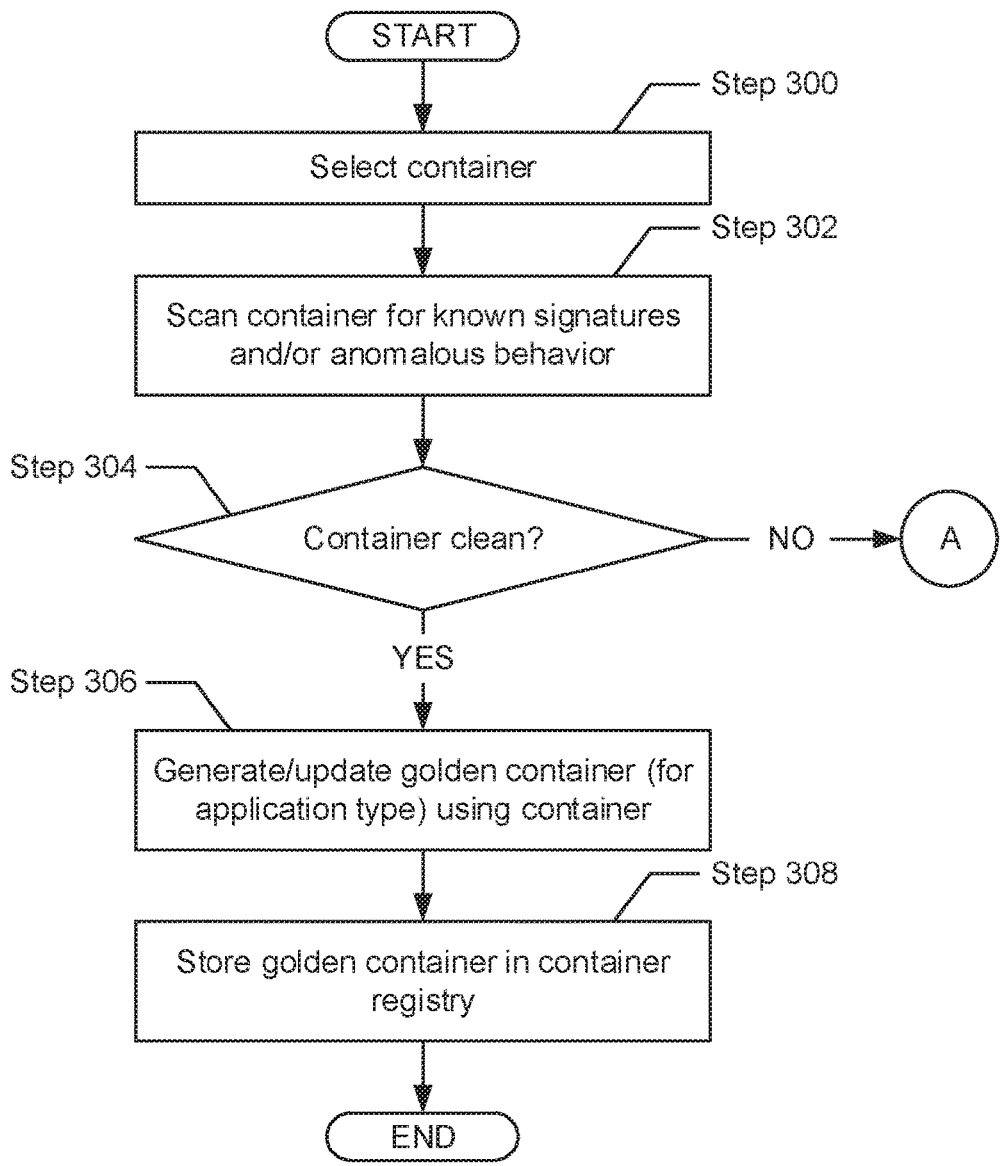
FIGS. 3A and 3B show flowcharts describing a method for configuring golden containers in accordance with one or more embodiments of the invention.
Figure 3B:
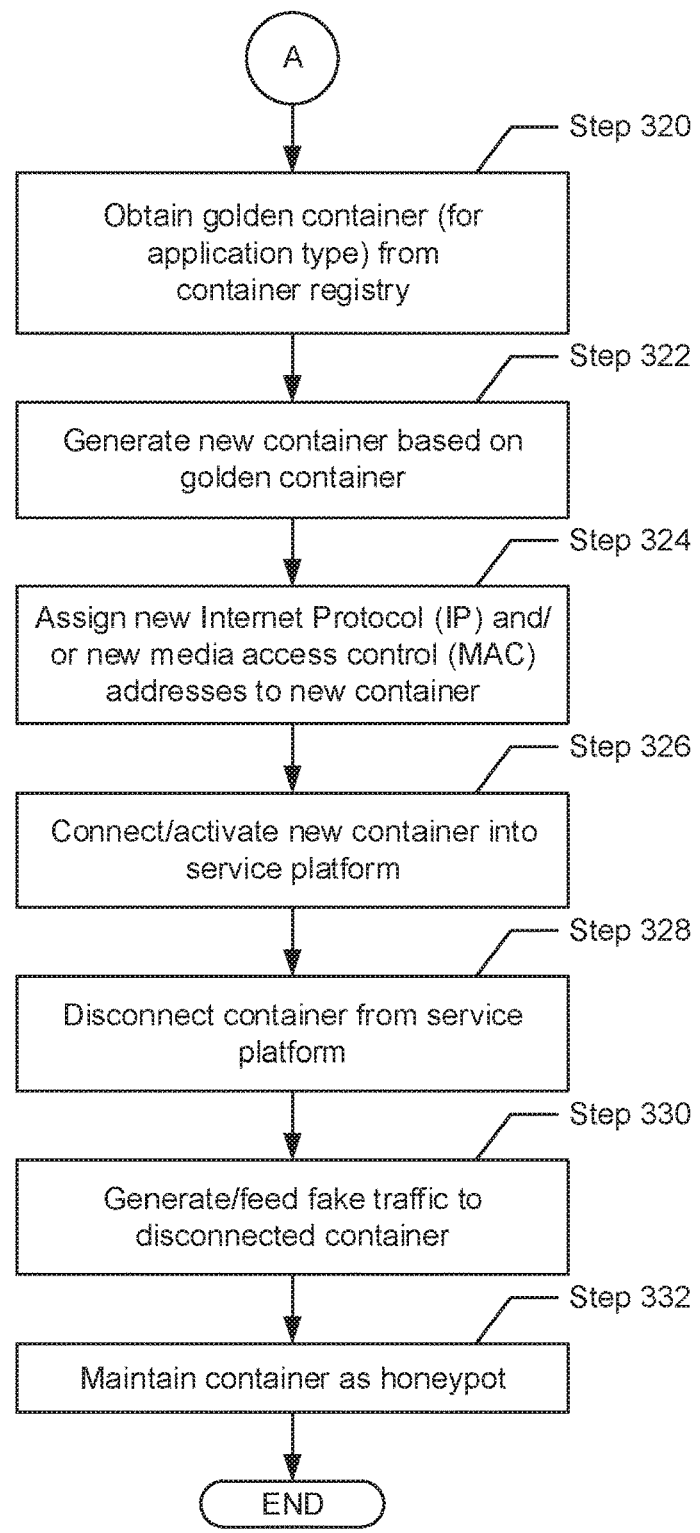

FIGS. 3A and 3B show flowcharts describing a method for configuring golden containers in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 3A and 3B may be performed in parallel with any other steps shown in FIG. 4 without departing from the scope of the invention.

Turning to FIG. 3A, in Step 300, the CMS kernel (executing on the CMS) (see e.g., FIG. 2) selects a container. In one embodiment of the invention, the selected container may be one of the one or more actively executing containers of a specific application type for a service implemented on the service platform. Further, selection of the container may be based on an updating schedule configured into the CMS. The updating schedule may specify periodic times (e.g., days of the week, hours or minutes of the day, etc.) during which golden containers implementing each service deployed on the service platform are to be generated/updated.

In Step 302, the CMS kernel submits a scan request to the container scanner (see e.g., FIG. 2). In one embodiment of the invention, the scan request may include a container ID uniquely identifying the container (selected in Step 300). Upon receiving the scan request, the container scanner may locate the selected container actively executing on the service platform using at least the container ID, and thereafter, proceed in validating the selected container. Validation of the selected container may entail employing one or more misuse and/or anomaly detection techniques to scan and/or monitor the selected container. More specifically, with respect to misuse detection, the container scanner may subject the selected container to one or more algorithms that scan for digital signatures associated with one or more known cyber threats and/or attacks infecting at least a portion of the selected container. With respect to anomaly detection, the container scanner may generate a model of the intended behavior (i.e., expected normal operation) for the selected container, and subsequently, monitor for behavior exhibited by the selected container that deviates from the generated model.

In Step 304, a determination is made, by the container scanner, as to whether the selected container is clean. In one embodiment of the invention, the selected container may be deemed clean when, based on the validation process, the selected container does not exhibit any digital signatures for known cyber threats and/or attacks, and does not exhibit behavior that deviates from the generated model. In another embodiment of the invention, the selected container may be deemed contaminated when, based on the validation process, the selected container does exhibit at least one digital signature associated with a known cyber threat and/or attack, and/or does exhibit behavior deviating from the generated model. Subsequently, if it is determined that the selected container is clean, the process proceeds to Step 306. On the other hand, if it is alternatively determined that the selected container is contaminated, the process proceeds to Step 320 (see e.g., FIG. 3B).

In Step 306, after determining (in Step 304) that the selected container is clean, the CMS kernel generates a golden container. In one embodiment of the invention, the CMS kernel may generate the golden container based on validation process results (i.e., indicating that the selected container was found to be clean) returned from the container scanner in the form of a scan response. Further, the golden container may be generated using at least a portion of the selected container. Based on the application type of the selected container, the golden container may be generated as an updated template from which all future generated containers of the application type for implementing a service are based. In Step 308, the CMS kernel subsequently stores the golden container (generated in Step 306) in the container repository residing on the CMS. In one embodiment of the invention, the CMS kernel may store the golden container within a logical partition reserved for the specific service the selected container is, at least in part, implementing.

Turning to FIG. 3B, in Step 320, after determining (in Step 304) that the selected container is contaminated, the CMS kernel obtains a golden container from the container registry. In one embodiment of the invention, the CMS kernel may retrieve the golden container based on validation process results (i.e., indicating that the selected container was found to be contaminated) returned from the container scanner in the form of a scan response. Further, the golden container obtained from the container registry may be of the same application type as the selected container. More specifically, the obtained golden container may be retrieved from a logical partition reserved for the specific service the selected container is, at least in part, implementing.

In Step 322, the CMS kernel generates a new container. In one embodiment of the invention, the CMS kernel may generate the new container based on the template outlined by the golden container (obtained in Step 320). The new container may be generated as a substitute for the selected container determined to be contaminated in Step 304, and accordingly, may be associated with the same application type as the selected container and the golden container.

In Step 324, the CMS kernel assigns an Internet Protocol (IP) address to the new container (generated in Step 322). In one embodiment of the invention, a new IP address is assigned rather than transferring the existing IP address associated with the selected container to the new container. In one embodiment of the invention, a new IP address may be assigned to the new container as a moving target defense (MTD) measure. In another embodiment of the invention, the CMS kernel may further assign a media access control (MAC) address to the new container. The MAC address may be a new MAC address rather than the existing MAC address associated with the selected container. Similarly, the new MAC address may be assigned to the new container as another MTD measure.

In one embodiment of the invention, a MTD measure may refer to the imposition of an asymmetric disadvantage on cyber attackers (i.e., hackers) by making a system dynamic, and therefore, more difficult to explore and/or predict. In contrast, prior to the deployment of MTD measures, the static nature of systems had rendered the systems vulnerable to attack from hackers and harder to defend. This was/is the case because the static nature of a system provided hackers with an asymmetric advantage, which included sufficient time to study the system, assess the vulnerabilities of the system, and determine an optimal time to inflict maximum damage on the system. With the implementation of one or more MTD measures, however, aspects of a system (e.g., a server, a container, etc.) are constantly changing, thereby impeding hacker efforts to, for example, map a system, inflict malicious activity onto the system, and execute the aforementioned malicious activities without alarming the system.

In Step 326, the CMS kernel connects the new container into the service platform. Specifically, in one embodiment of the invention, the new container may be directed to a pod on the service platform that implements the service that the selected container may be, at least in part, implementing. At this point, the new container replaces the selected (contaminated) container, thereby restoring one or more functionalities of the service, which may have been affected by malicious activity.

In Step 328, after connecting the new container, the CMS kernel disconnects the selected (contaminated) container from the service platform. Specifically, in one embodiment of the invention, the selected (contaminated) container may be removed from the pod on the service platform that implements the service that the new container (in place of the selected container) is now, at least in part, implementing. Thereafter, the selected (contaminated) container may be relocated to a logically segregated space on the service platform reserved for maintaining honeypots.

In Step 330, after relocating the selected container, the CMS kernel generates emulated network traffic, and subsequently, feeds the emulated network traffic to the selected container. In one embodiment of the invention, the emulated network traffic may include the simulation of interactions particular to the associated application type of the selected container that, under normal operations, may occur between the selected container and other components. For example, if the selected container is a front-end application type container, the emulated network traffic may include simulated server-client transfers, which may be implemented through a looping of a batch request for resources transmitted to the selected container.

In Step 332, after generating/feeding the emulated network traffic, the CMS kernel maintains and monitors the selected container as a honeypot. In one embodiment of the invention, a honeypot container may be a decoy container utilized for trapping (i.e., engaging and deceiving) hackers. By luring in and trapping hackers, a honeypot container may be employed to study the activities of the trapped hacker(s) in order to track and identify how hackers intrude and/or infect a container (i.e., the selected container). Furthermore, by studying these aforementioned hacker activities, countermeasures may be developed to better protect the container, the service, or the service platform from future unauthorized activities.

Figure 4:
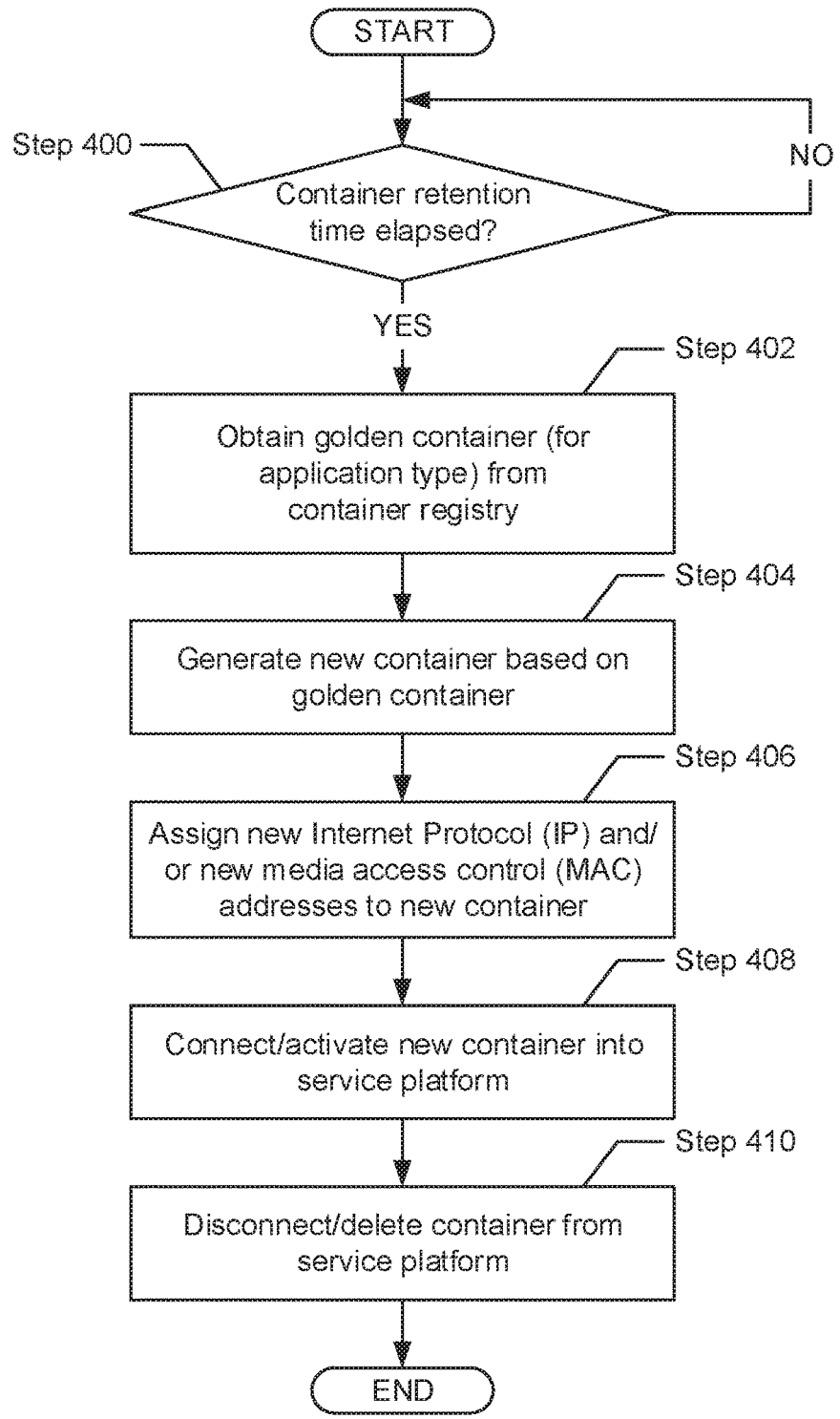
FIG. 4 shows a flowchart describing a method for employing golden containers in accordance with one or more embodiments of the invention.

FIG. 4 shows a flowchart describing a method for employing golden containers in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 4 may be performed in a parallel with any other steps shown in FIGS. 3A and 3B.

Turning to FIG. 4A, in Step 400, a determination is made, by the retention tracker on the CMS (see e.g., FIG. 2) as to whether a retention time for a container has elapsed. In one embodiment of the invention, the container may be an actively executing container that implements at least a portion of a service deployed on the service platform. Further, as described above, a container retention time refers to a duration of time specifying the configured lifespan of the container. If it is determined that the retention time for a container has elapsed, then the process proceeds to Step 402. On the other hand, if it is alternatively determined that the retention time for any container has yet to elapse, then the retention tracker resumes monitoring the retention times of all containers executing on the service platform until another determination may be made.

In Step 402, after determining (in Step 400) that the retention time for a container has elapsed, the retention tracker issues an elapse notification to the CMS kernel. In one embodiment of the invention, the elapse notification may include a container ID that uniquely identifies the container associated with the elapsed retention time (i.e., the old container). Thereafter, in response to receiving the elapse notification, the CMS kernel obtains a golden container from the container registry. In one embodiment of the invention, the golden container obtained from the container registry may be of the same application type as the old container. More specifically, the obtained golden container may be retrieved from a logical partition reserved for the specific service the old container is or has been, at least in part, implementing.

In Step 404, the CMS kernel generates a new container. In one embodiment of the invention, the CMS kernel may generate the new container based on the template outlined by the golden container (obtained in Step 402). The new container may be generated as a substitute for the old container, whose retention time had elapsed through a determination performed in Step 400, and accordingly, may be associated with the same application type as the old container and the golden container.

In Step 406, the CMS kernel assigns an Internet Protocol (IP) address to the new container (generated in Step 404). In one embodiment of the invention, a new IP address is assigned rather than transferring the existing IP address associated with the old container to the new container. In one embodiment of the invention, a new IP address may be assigned to the new container as a MTD measure (described above). In another embodiment of the invention, the CMS kernel may further assign a media access control (MAC) address to the new container. The MAC address may be a new MAC address rather than the existing MAC address associated with the old container. Similarly, the new MAC address may be assigned to the new container as another MTD measure.

In Step 408, the CMS kernel connects the new container into the service platform. Specifically, in one embodiment of the invention, the new container may be directed to a pod on the service platform that implements the service that the old container may be, at least in part, implementing. At this point, the new container replaces the old container, thereby assuming one or more functionalities of the service, which may have been implemented by the old container.

In Step 410, after connecting the new container, the CMS kernel disconnects the old container from the service platform. Specifically, in one embodiment of the invention, the old container may be deleted, leading to the deallocation of server computing resources expended towards implementing the old container.

Figure 5:
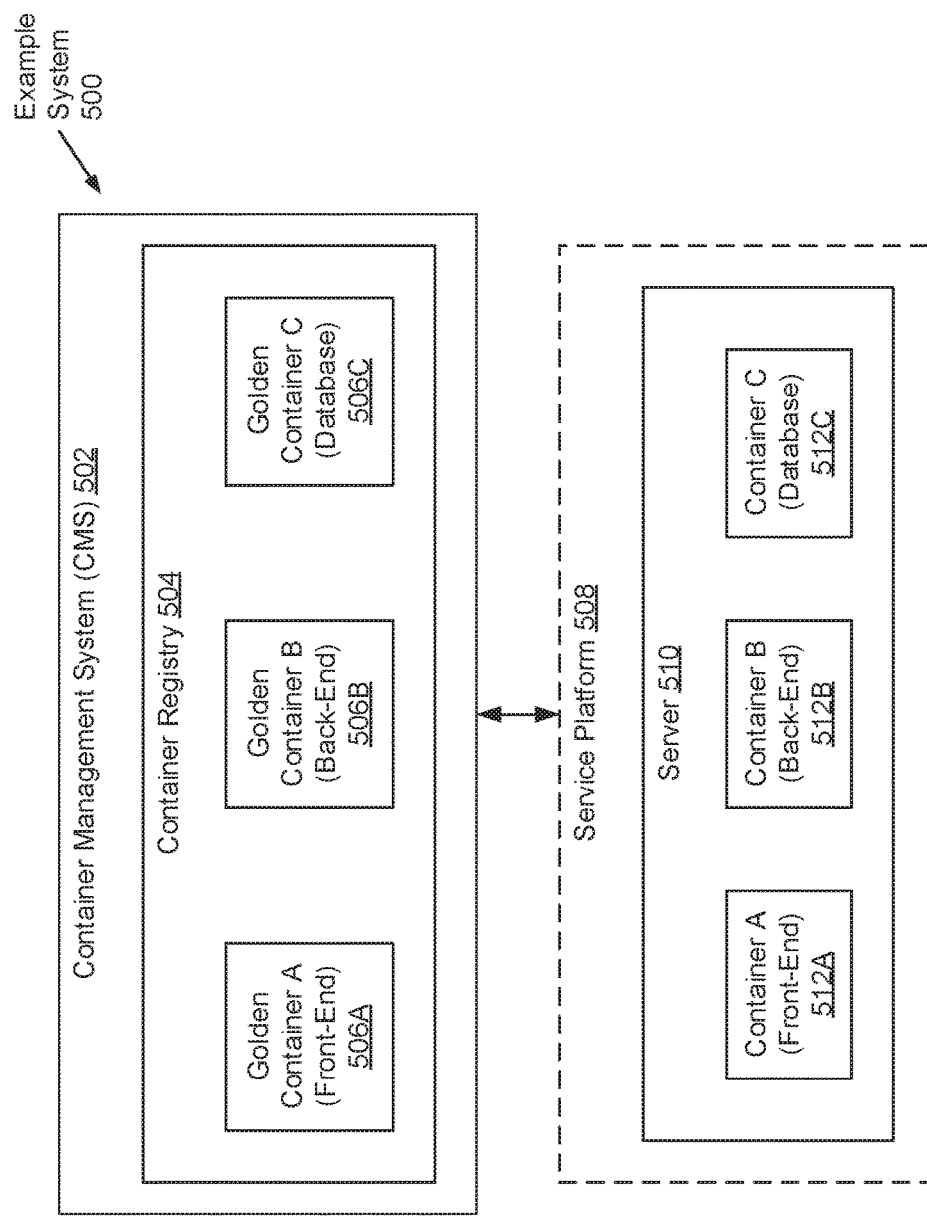
FIG. 5 shows an example system in accordance with one or more embodiments of the invention.

FIG. 5 shows an example system in accordance with one or more embodiments of the invention. The following example, presented in conjunction with components shown in FIG. 5, is for explanatory purposes only and not intended to limit the scope of the invention.

Turning to FIG. 5, the example system (500) includes a CMS (502) operatively connected to a service platform (508). The CMS (502) includes a container registry (504) storing: (i) a first golden container (506A) representative of a template for all front-end application type containers in a service; (ii) a second golden container (506B) representative of a template for all back-end application type containers in the service; and (iii) a third golden container (506C) representative of a template for all database application type containers in the service. Though not depicted, the CMS (502) may further include a CMS kernel, a retention tracker, and a container scanner (see e.g., FIG. 2). Meanwhile, the service platform (508) includes a server (510), whereon three containers (512A-512C) are actively executing. Specifically, the three aforementioned containers include: (i) a first container (512A) implementing a front-end portion of the service; (ii) a second container (512B) implementing a back-end portion of the service; and (iii) a third container (512C) implementing a database portion of the service.

Turning to the example, consider a first scenario whereby a schedule directs the CMS kernel (not shown) to update the third golden container (506C). Based on the schedule, the CMS kernel selects a container actively executing on the service platform (508)—e.g., the third container (512C), which is of the same application type as the third golden container (506C). Afterwards, the CMS kernel issues a scan request to the container scanner (not shown), which includes a container ID—e.g., "dbcontC"—that uniquely identifies the third container (512C). Using the container ID, the container scanner locates the third container (512C) on the server (510), and subjects the third container (512C) to one or more misuse and anomaly detection algorithms. Specifically, with respect to the misuse detection algorithms, the container scanner may scan the third container (512C) for digital signatures associated with known cyber threats and/or attacks. Further, with respect to anomaly detection algorithms, the container scanner may generate a model of the intended behavior of the third container (512C), and subsequently, monitor the actual behavior of the third container (512C) for deviations performed outside the behavioral boundaries of the model. Based on this validation process, the container scanner determines that the third container (512C) does not contain any known digital signatures, and more so, does not exhibit any abnormal behavior. Subsequently, the container scanner issues a scan response to the CMS kernel indicating that the third container (506C) is clean.

In considering the validation process results obtained through the scan response, the CMS kernel then generates a fourth golden container (not shown) using at least a portion of the third container (512C). Like the third container (512C) and the third golden container (506C), the fourth golden container belongs to the database application type. Thereafter, the CMS kernel updates the container registry (504) by storing the fourth golden container therein. The fourth golden container may be stored as the latest version of the database application type golden containers. Consequently, the fourth golden container may be used as the template for the generation of new database application type containers that assist in the implementation of the service deployed on the service platform (508).

Now, consider a second scenario whereby the retention time configured for first container (512A) has elapsed. Upon detecting this elapsing, the retention tracker (not shown) issues an elapse notification to the CMS kernel (not shown). The elapse notification includes the container ID—e.g., "frontcontA"—that uniquely identifies the first container (512A). Upon receiving the elapse notification, the CMS kernel identifies the application type associated with the container ID, thereby determining that the first container (512A) belongs to the front-end application type. Based on this determination, the CMS kernel accesses the container registry (504) and obtains the first golden container (506), which also belongs to the front-end application type. Thereafter, the CMS kernel generates a fourth container (not shown) based on the template represented by the first golden container (506A). Next, the CMS kernel connects the fourth container into the service deployed on the service platform (508) that the first container (512A) is, at least in part, implementing. Once connected, the fourth container assumes the functionalities and responsibilities that had been carried out by the first container (512A), after which the CMS kernel disconnects the first container (512A) from the service (i.e., relieves the first container (512A) of its duties) and subsequently proceeds to delete the first container (512A).

Figure 6:
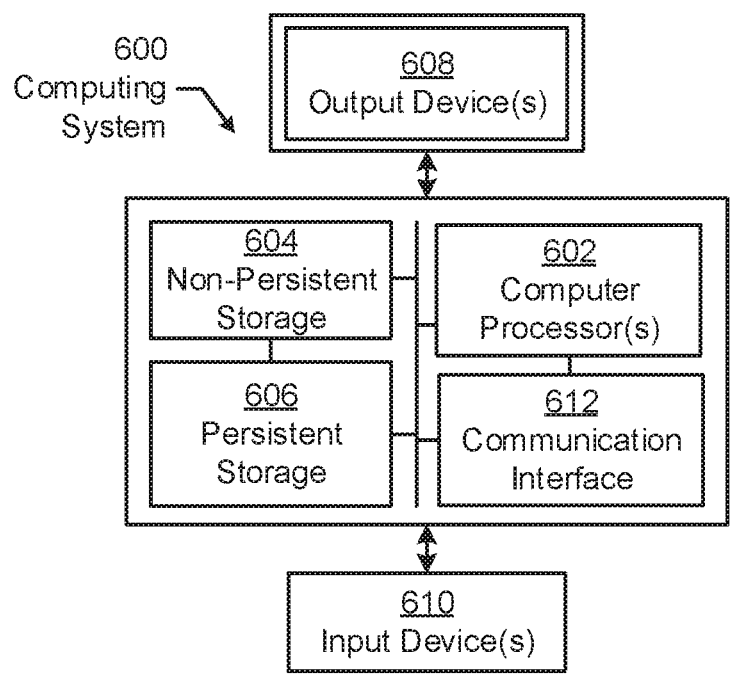
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile storage, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing containers, comprising:
    selecting a first container executing on a service platform;
    scanning the first container for malicious activity;
    based on the scanning, determining that the first container is contaminated;
    in response to the determining, obtaining a golden container from a container registry;
    generating a second container based on the golden container;
    connecting the second container into the service platform to replace the first container;
    disconnecting the first container from the service platform;
    after disconnecting the first container from the service platform:
        feeding emulated network traffic to the first container; and
        maintaining the first container as a honeypot.

2. The method of claim 1, wherein the first container is associated with a first Internet Protocol (IP) address and a first media access control (MAC) address, wherein the second container is associated with a second IP address and a second MAC address.

3. The method of claim 1, further comprising:
    determining that a retention time for a third container has elapsed;
    in response to the determining, obtaining the golden container from the container registry;
    generating a fourth container based on the golden container;
    connecting the fourth container into the service platform to replace the third container; and
    disconnecting the third container from the service platform.

4. The method of claim 3, further comprising:
    selecting a third container executing on the service platform;
    scanning third container for the malicious activity;
    based on the scanning, determining that the third container is clean;
    in response to the determining, generating the golden container based on the third container; and
    storing the golden container in the container registry.

5. The method of claim 3, wherein the first container, the golden container, the second container, the third container, and the fourth container are all associated with a same application type.

6. The method of claim 1, wherein the malicious activity comprises at least one in a group consisting of a known attack signature and anomalous behavior.

7. A system, comprising:
    a service platform; and
    a container management system (CMS) kernel operatively connected to the service platform, and programmed to:
        select a first container executing on a service platform;
        scan the first container for malicious activity;

based on the scanning, determine that the first container is contaminated;
in response to the determining, obtain a golden container from a container registry;
generate a second container based on the golden container;
connect the second container into the service platform to replace the first container;
disconnect the first container from the service platform;
after disconnecting the first container from the service platform:
feed emulated network traffic to the first container; and
maintain the first container as a honeypot.

8. The system of claim 7, further comprising a set of servers whereon a set of containers is executing, wherein the service platform comprises the set of servers, wherein the set of containers comprises the first container and the second container.

9. The system of claim 7, further comprising a CMS comprising the CMS kernel and the container registry.

10. The system of claim 7, further comprising a container scanner operatively connected to the CMS kernel, and programmed to:
scan a third container executing on the service platform for malicious activity, wherein the CMS kernel is further programmed to:
select the third container;
generate a scan request comprising a container ID associated with the third container;
submit the scan request to the container scanner;
after scanning of the third container, receive a scan response from the container scanner;
based on the scan response, determine that the third container is clean;
in response to the determining, generate the golden container based on the third container; and
store the golden container in the container registry.

11. The system of claim 7, wherein the container management system (CMS) is further programmed to:
determine that a retention time for a third container has elapsed;
in response to the determining, obtain a golden container from the container registry;
generate a fourth container based on the golden container;
connect the fourth container into the service platform to replace the third container; and
disconnect the third container from the service platform.

12. The system of claim 11, further comprising a retention tracker operatively connected to the CMS kernel, and programmed to:
track the retention time for the third container;
based on an elapsing of the retention time, notify the CMS kernel of the elapsing;
based on a connecting of the fourth container, initialize a second retention time for the fourth container; and
track the second retention time.

13. The system of claim 11, wherein the first container, the golden container, the second container, and the third container, and the fourth container are all associated with a same application type.

14. A non-transitory computer readable medium (CRM) comprising computer readable program code, which when executed by a computer processor, enables the computer processor to:
select a first container executing on a service platform;
scan the first container for malicious activity;
based on the scanning, determine that the first container is contaminated;
in response to the determining, obtain a golden container from a container registry;
generate a second container based on the golden container;
connect the second container into the service platform to replace the first container;
disconnect the first container from the service platform;
after disconnecting the first container from the service platform:
feed emulated network traffic to the first container; and
maintain the first container as a honeypot.

15. The non-transitory CRM of claim 14, wherein the first container is associated with a first Internet Protocol (IP) address and a first media access control (MAC) address, wherein the second container is associated with a second IP address and a second MAC address.

16. The non-transitory CRM of claim 14, further comprising additional computer readable program code, which when executed by the computer processor, enables the computer processor to:
select a third container executing on the service platform;
scan the third container for malicious activity;
based on the scanning, determine that the third container is clean;
in response to the determining, generate the golden container based on the third container; and
store the golden container in the container registry.

17. The non-transitory CRM of claim 14, wherein malicious activity comprises at least one in a group consisting of a known attack signature and anomalous behavior.

18. The non-transitory CRM of claim 14, further comprising additional computer readable program code, which when executed by the computer processor, enables the computer processor to:
determine that a retention time for a third container has elapsed;
in response to the determining, obtain a golden container from a container registry;
generate a fourth container based on the golden container;
connect the fourth container into a service platform to replace the first container; and
disconnect the third container from the service platform.

19. The non-transitory CRM of claim 18, wherein the first container, the golden container, the second container, the third container, and the fourth container are all associated with a same application type.

* * * * *